(No Model.)

W. A. SUTFIN.
AUTOMATIC HOSE COUPLING.

No. 605,238. Patented June 7, 1898.

WITNESSES
Jos. C. Stack
WM Boynton

INVENTOR
Willis A. Sutfin.
By John Wedderburn
Attorney

UNITED STATES PATENT OFFICE.

WILLIS A. SUTFIN, OF MARYSVILLE, CALIFORNIA.

AUTOMATIC HOSE-COUPLING.

SPECIFICATION forming part of Letters Patent No. 605,238, dated June 7, 1898.

Application filed March 1, 1897. Serial No. 625,437. (No model.)

*To all whom it may concern:*

Be it known that I, WILLIS A. SUTFIN, a citizen of the United States, residing at Marysville, in the county of Yuba and State of California, have invented certain new and useful Improvements in Automatic Hose-Couplings; and I do hereby declare the following to be a full, clear, and exact description of the invention, such as will enable others skilled in the art to which it appertains to make and use the same.

This invention relates to hose-couplings, and has special reference to the provision of an automatic coupling device for use in connection with air-pumps, the device being instantly adjusted to fit a valve of any make of pneumatic tire and quickly and readily detached from the same.

The invention also consists of certain other novel features of construction hereinafter particularly set forth and claimed.

Figure 1:
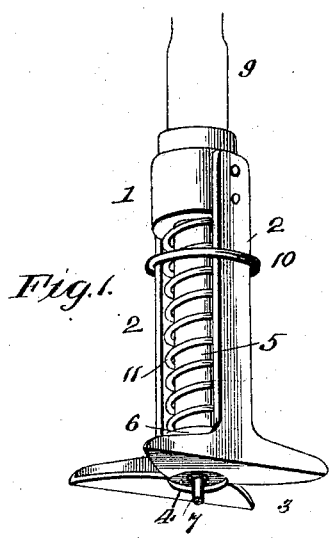
Figure 2:
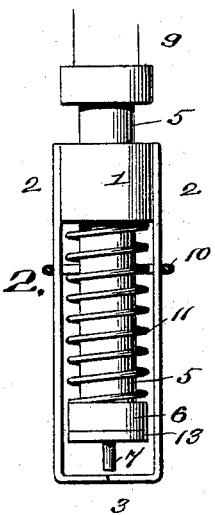
Figure 3:
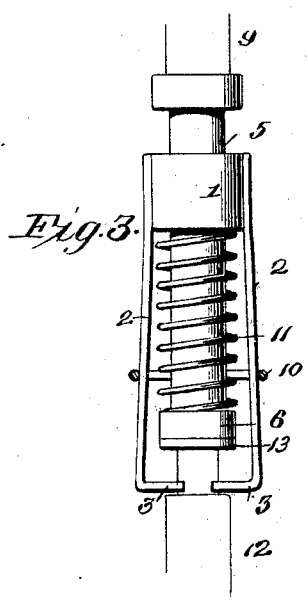
Figure 4:
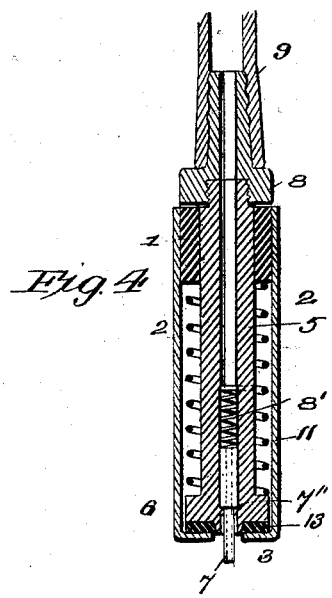

In the accompanying drawings, forming a part of this specification, Figure 1 is a perspective view of my device. Fig. 2 is an elevation of the same ready to be attached and secured in position upon a valve, and Fig. 3 is a similar view showing the coupling adjusted. Fig. 4 is a longitudinal sectional view of the coupler.

Referring to said drawings, 1 indicates a collar, and secured to the opposite sides of the same are the spring-arms 2. These arms 2 have the jaws 3 formed on their upper free ends, the meeting edges of said jaws being rounded out at 4.

Adapted to move within the collar 1 is a section of pipe 5, which is provided on its end between the arms 2 with a cap 6. This cap 6 forms a flange which is adapted to abut against the collar and prevent the pipe or tube from being withdrawn from the same. The coiled spring 11 bears at one end against the under side of said flange and at its opposite end presses against the collar. This spring serves to press the tube or section of pipe upward between the spring-arms.

The cap 6 is centrally perforated, and adapted to move in this perforation is tubular pin 7, which is formed with the shoulder 7" within the casing 5 to limit the outward movement of the same. A coiled spring 8' normally projects the pin from the casing. When the attachment is applied to a valve, the pin extends within the same and prevents any slipping of the parts. This pin also serves to keep an open air-passage, as the pressure upon the rubber washer 13 on the top of cap 6 sometimes closes the opening, the air, as will be understood, passing into the valve of the pneumatic tire through the tubular pin. The object of making the pin movable is to enable the same to move within the casing 5 should the opening in the valve of the pneumatic tire be too small to admit the same. This pin could be made immovable, if desired, without departing from the spirit of the invention, although I prefer to construct the same movable. The opposite end of the tube or pipe 5 is screw-threaded to receive a cap 8, which limits its movement within the collar and prevents its being disengaged from the same. Upon the reduced end of the cap 8 the tube 9 from the air-pump is adapted to be secured.

The ring 10 is adapted to be moved upon the spring-arms 2 and hold the jaws together when they are positioned upon the valve.

When it is desired to connect the air-pump with the valve of the pneumatic tire, the jaws are grasped and pulled forward, the other hand of the operator holding the cap 8, the coiled spring 11 being contracted, as illustrated in Fig. 2. When in this position, the valve 12 is inserted between the jaws, the edge of the jaws being rounded to permit the same to be readily inserted therebetween and pushed inwardly until the rounded-out portion of the jaws is reached, where the valve will be secured, as will be readily understood. The arms 2 being of spring metal, the jaws are easily separated for the passage of the valve therebetween. The tube 5 is then released, and the coiled spring expands and forces the same in engagement with the valve, the tubular pin of the casing extending within the valve and preventing the casing slipping from the valve. The ring is then moved upon the spring-arms and prevents the jaws from separating, as will be readily understood. By making the arms of heavy spring metal the ring is dispensed with.

From the foregoing description it will be seen that I have produced a coupling device which is instantly attached to or detached from the valve of any make of pneumatic tire, the operation of the coupling being automatic.

While I have here illustrated and described my invention as being applied to an air-pump for use in connection with bicycles, yet it will be understood that the same can be applied wherever two sections of piping are to be coupled temporarily—as, for instance, garden-hose and other similar piping.

Having thus described my invention, what I claim as new, and desire to secure by Letters Patent, is—

1. An improved coupling, comprising a uniting and holding device, a socket portion carried thereby open from end to end, a tube longer than the socket and extending therethrough and provided with enlargements on opposite sides of the socket, the space between the enlargements being longer than the socket, and a spring arranged between the forward enlargement and the socket for holding the tube normally extended toward the holding device, the opposite end of the tube being adapted to connect with a hose or other pipe.

2. A pipe-coupling comprising a fixed member, a movable member adapted to move within the fixed member, the fixed member provided with gripping members for holding one section of the piping to be coupled, the other section of the piping to be coupled adapted to be attached to the movable member, and means for holding the movable member in engagement with the section of piping secured by the gripping members substantially as shown and described.

3. A hose-coupling, comprising a gripping member adapted to receive and hold one section of the pipe to be coupled, a section of pipe or tube movable upon the gripping member and adapted to receive the other section of pipe to be coupled, and means for holding the opposite end of the movable pipe pressed against the pipe held by the gripping member, substantially as described.

4. The combination of a collar, spring-arms secured to said collar, jaws carried by the opposite end of said arms and adapted to receive one section of the pipe to be coupled, a tube movable in said collar and adapted to receive the other section of the pipe to be coupled, at its outer end and at its inner end adapted to engage the section of pipe held by the jaws, and means for holding said tube pressed against said pipe, substantially as described.

5. The combination of a collar, spring-arms secured thereto, jaws formed on the opposite ends of said arms and adapted to hold one section of the pipe to be coupled, a tube movable through the collar and adapted to receive the other section of the pipe to be coupled, means for holding the opposite end of said tube in engagement with the section of pipe held by the jaws, and a ring movable upon said spring-arms for the purpose of preventing their disengagement from the section of pipe held thereby, substantially as described.

6. A pipe-coupling comprising a collar, gripping members carried thereby and adapted to hold one section of the pipe to be coupled, a tube movable through the collar to which the other section of the pipe to be coupled is adapted to be secured, means for holding said tube normally in engagement with the section of pipe held by the gripping member, a perforated cap upon the opposite end of said tube, a perforated pin movable in the tube and normally pressed outward and a stop upon said pin for limiting its outward movement, substantially as described.

In testimony whereof I have signed this specification in the presence of two subscribing witnesses.

WILLIS A. SUTFIN.

Witnesses:
W. B. SWAIN,
C. S. BROOKS.